April 3, 1962 H. M. SIERRA 3,028,086

DIVISION SYSTEM

Filed Aug. 26, 1959 6 Sheets-Sheet 1

Huberto M. Sierra,
*INVENTOR.*
*BY.*

Robert H. Frasse

*ATTORNEY.*

Huberto M. Sierra,
*INVENTOR.*
*BY*
[signature]
*ATTORNEY.*

QUOTIENT SELECTION PLANE
DIGIT SENSE WINDINGS
(BINARY VALUES)

Huberto M. Sierra,
INVENTOR.
BY
Robert H. Fraser
ATTORNEY.

Fig. 4

EXAMPLE: 983578 ÷ 125 A 4 Digit quotient is desired

| DIVISOR | DIVIDEND | PHASE | ARITHMETIC STEP |
|---|---|---|---|
| 125 | 9 8 3 5 7 8 | 3: | 9 ÷ 1 TABLE: 6 |
| | | 4: | 6 × 125 = 750 |
| | 2 4 9 | 5: | COMPLEMENT OF 750 = 249 |
| CARRY | 2 3 3 5 7 8 | 6: | THERE IS A CARRY. HIGH ORDER DIGIT = 0 233 > 125 QUOTIENT = 6 + 1 = 7 COMPLEMENT OF 125 = 874 |
| | 8 7 4 | | |
| CARRY | 1 0 8 5 7 8 | 6: | 108 < 125 |
| | | 3: | 1 ÷ 1 TABLE: 9 |
| 1 | 0 8 5 7 8 | 3: | SHIFT DIVIDEND |
| | | 4: | 9 x 125 = 1125 |
| 8 | 8 7 4 | 5: | COMPLEMENT OF 1125 = 8874 |
| NO 9 | 9 6 0 7 8 | 7: | NO CARRY. QUOTIENT: 79−1 = 78 |
| CARRY | 1 2 5 | | |
| CARRY 0 | 0 8 5 7 8 | 6: | CARRY PRESENT. HIGH ORDER DIGIT = 0 |
| | 8 5 7 8 | 6: | SHIFT DIVIDEND |
| | | 3: | 8 ÷ 1 TABLE: 6 |
| | | 4: | 6 x 125 = 750 |
| | 2 4 9 | 5: | COMPLEMENT OF 750 = 249 |
| CARRY | 1 0 7 8 | 6: | CARRY PRESENT. HIGH ORDER DIGIT ≠ 0 |
| | | 6: | 107 > 125 |
| | | 3: | 1 ÷ 1 TABLE: 9 |
| 1 | 0 7 8 | 3: | SHIFT |
| | | 4: | 9 x 125 = 1125 |
| 8 | 8 7 4 | 5: | COMPLEMENT OF 1125 = 8874 |
| NO 9 | 9 5 3 | 7: | NO CARRY. QUOTIENT = 7869−1 = 7868 |
| CARRY | 1 2 5 | | |
| CARRY 0 | 0 7 8 | 6: | CARRY PRESENT. HIGH ORDER DIGIT = 0 |

FOUR DIGIT QUOTIENT SENSED
AND OPERATION IS STOPPED.
QUOTIENT = 7868

Huberto M. Sierra,
INVENTOR.
BY
[signature]
ATTORNEY.

Fig. 5 PROGRAM CONTROL CIRCUITS
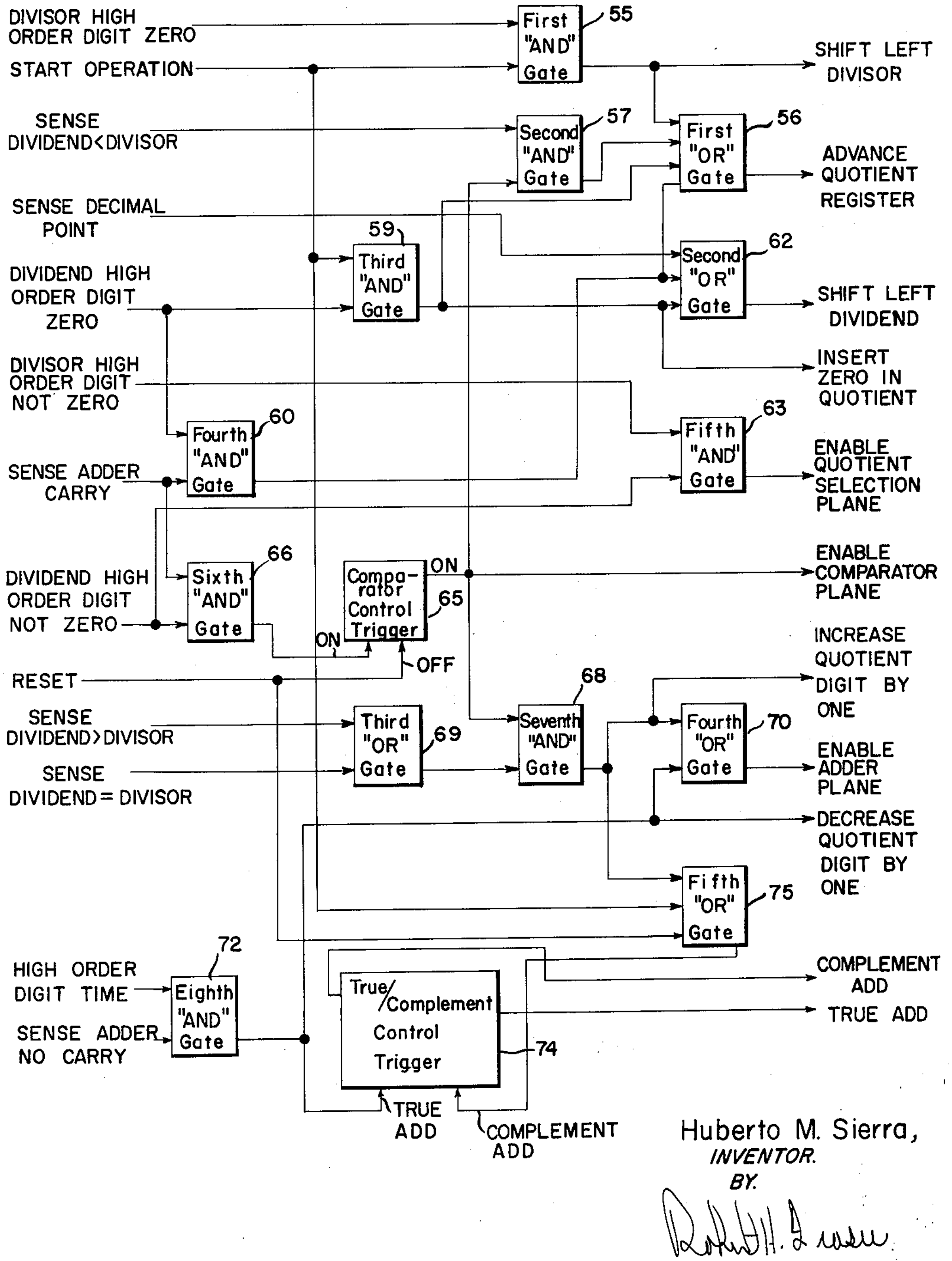
Huberto M. Sierra,
*INVENTOR.*
*BY*
[signature]
*ATTORNEY.*

STEPS OCCURING WITHIN PHASES OF A DIVISION OPERATION

United States Patent Office 3,028,086

Patented Apr. 3, 1962

3,028,086

DIVISION SYSTEM

Huberto M. Sierra, Santa Clara, Calif., assignor to International Business Machines Corporation, New York, N.Y., a corporation of New York Filed Aug. 26, 1959, Ser. No. 836,156

13 Claims. (Cl. 235—160)

This invention relates to digital division systems and more particularly to apparatus for reliably dividing one multidigit number by another at high speed.

Modern data processing machines operate relatively slowly in performing division programs. In dividing one number by another, the system must usually perform an operation which is either analogous to long hand division or which provides equivalent steps. Just as long hand division is one of the more complicated basic arithmetic operations, division by a data processing machine is one of the more complicated functions which the machine must perform.

Inasmuch as the speed with which an arithmetic unit in a data processing system operates is largely determinative of the speed of the system, it is highly desirable to be able to perform division operations as quickly as possible. While speed is desirable, it is not permissible to decrease system reliability or to add extensively to the circuitry which must be used. It is especially desirable, therefore, to be able to use to a maximum extent those functional units which provide particularly good combinations of speed and reliability. Units which have these characteristics may be of the type which use planes of individual elements to perform arithmetic functions.

In one particularly desirable form, the planes of elements in such a unit may be constituted of a number of bistable elements arranged in a matrix. Most often, these matrices are composed of rectangular arrays of magnetic cores, each of which is addressed by two addressing conductors which are threaded through the core. The addressing conductors are disposed in two groups, one of the groups defining the vertical columns and the other defining the horizontal rows of the rectangular matrix. The cores each have a substantially rectangular hysteresis characteristic, and the energizing currents in the conductors are adjusted so that energization of a single conductor does not change the state of magnetization of a core. Wherever two conductors which intersect are both energized, however, the core at the point of intersection is changed in state, or "operated." Selection of the conductors to be energized in each of the coordinate directions thus determines the core which is operated. With this arrangement are also employed output circuits which provide the desired arithmetic result for each possible combination of input factors. Each of the output circuits serially threads a number of the cores in a selected pattern, so that individual circuits or combinations of circuits provide output signals which are arithmetic functions, such as a sum or product, of the input values.

With these magnetic core matrices and other forms of reference planes used for performing arithmetic functions, relatively complicated arithmetic operations can sometimes be performed in essentially a single step. The matrices operate at high speed, and due to the stable and reliable nature of the magnetic cores do not vary in characteristic with time or use.

It is therefore an object of the present invention to provide an improved division apparatus for data processing systems.

It is another object of the present invention to provide an improved division system which operates with greater speed and reliability than has heretofore been practicable.

A further object of the present invention is to provide an improved division system which makes effective use of the speed and reliability of arithmetic units formed of planes of elements.

It is still another object of the present invention to provide an improved system for dividing one multidigit number by another multidigit number, and utilizing planes of elements to achieve particular combinations of accuracy and economy.

It is still a further object of the present invention to provide an improved digital division system making use of arithmetic components formed of planes of bistable elements, which system can perform a division operation on multidigit numbers rapidly and accurately, and which permits the associated arithmetic units also to be operated independently.

A division system in accordance with the present invention achieves these and other objects through use of an integrated arrangement in which a number of planes of elements provide the basic steps of a division operation. The selection of a quotient is provided by a plane of bistable elements which provide outputs representative of trial quotient values, these trial quotient values thereafter being multiplied by the divisor and the product subtracted from the dividend to provide a trial remainder. The individual quotient digits, and the trial remainder, are adjusted until the quotient digits are correct. The adjustments are made by comparator and adder circuitry in such a way as to generate a new dividend for selection of the next succeeding quotient digit in an unbroken sequence. This process in effect derives a final remainder which does not require adjustment in order to proceed with the division.

Specifically, in one arrangement in accordance with the invention, divisor and dividend digits are applied to a plane of bistable elements, which selects a probable trial quotient. To determine the validity of this trial quotient, the divisor and the trial quotient are multiplied, and the product of this multiplication is subtracted from the divident to provide a trial remainder. A trial product which is greater than the comparable part of the dividend results in a negative trial remainder. With a negative trial remainder, adjustments are made in the trial quotient by subtracting a one, and in the trial remainder by adding the divisor value. This step is repeated, if necessary, until a positive remainder results. If the trial product is greater than the associated portion of the dividend, the trial remainder is positive. In this situation the trial remainder is compared to the value of the divisor. If the trial remainder is greater than the divisor, the trial quotient is increased in value by one, and the divisor is subtracted from the remainder. This adjustment of both remainder and trial quotient are repeated until the remainder is positive and less than the divisor. This desired final condition is achieved through use of a comparison which does not affect the remainder. The system then begins the selection of the next succeeding quotient digit, using the initial digit of the divisor and the next succeeding digit of the dividend.

It is a feature of this invention that the various arithmetic functions may be provided by functional units which utilize planes of elements. These units, which may include a multiplier, a comparator plane and an adder plane, are utilized in conjunction with a quotient selection plane and with each other so that each may be operated in the most efficient manner but also be available for independent multiplication, comparison or addition functions at different times. Further advantages are derived through the use with this combination of additional circuitry which operates to short-cut the division operation wherever possible, so as to reduce the number of steps required and to increase the speed of the system.

A particular feature of the present invention is the manner in which quotient digits are selected. The arrangement utilized to derive the quotient digit is a matrix of bistable elements having coordinately disposed addressing conductors. Each of the elements within the quotient selection plane has an assigned value which corresponds to the most likely quotient for divisor and dividend values. The quotient selection plane thus permits a direct increase in the speed with which the system will operate on a large number of samples.

In accordance with another feature of the present invention, the number of steps in a division operation are substantially reduced by utilizing only a portion of dividend value at each step in the division process. The number of dividend digits which are employed are determined by the number of divisor digits. Further, only the initial digit of the divisor and single digits from the dividend are utilized in the operation of selecting the trial quotient. Consequently, the various subtractions, comparisons and multiplications may be effected with an appreciable reduction in the number of steps required.

A better understanding of the present invention may be had from a reading of the following detailed description and an inspection of the drawings, in which:

FIG. 4 is a chart, giving representative divisor and dividend values and showing the manner in which succeeding phases occur in a division operation in accordance with the present invention;

FIG. 5 is a block diagram of program control circuits which may be utilized in conjunction with the arrangement of FIG. 1.

The present example of a system in accordance with the invention is shown as an essentially independent division unit. This illustration, however, is employed only for clarity in relating the various units of the division system to each other. It will be understood that this system could be an integrated portion of an electronic data processing machine. The principal operating units, such as the multiplier, comparator and adder may operate independently during other portions of a programmed routine to provide their unique functions. Additionally, it will be recognized that these units need not necessarily be employed as shown, but that the data processing system may provide equivalent individual functions in some other way. Thus the multiplication unit may be replaced by a computer program which accomplishes the same result. In almost every instance, however, such a modification would result in a decrease in the speed of operation of the present system.

Operation of the arrangement to be described will be discussed only in terms of multidigit divisors and dividends, inasmuch as a division operation on such factors is the most difficult example which could be provided. A system will be described as it may be constructed in conjunction with decimal numbers, although numbers to any other base may be employed as well. In the present example, the decimal values are represented by signals on one out of ten conductors. In some instances, it is preferable to convert briefly to a binary coded decimal form, from which a reconversion to decimal form is again made. It will be recognized that where desired the conversion might be to some other than the binary coded decimal representation.

*Basic System Units*

Figure 1:
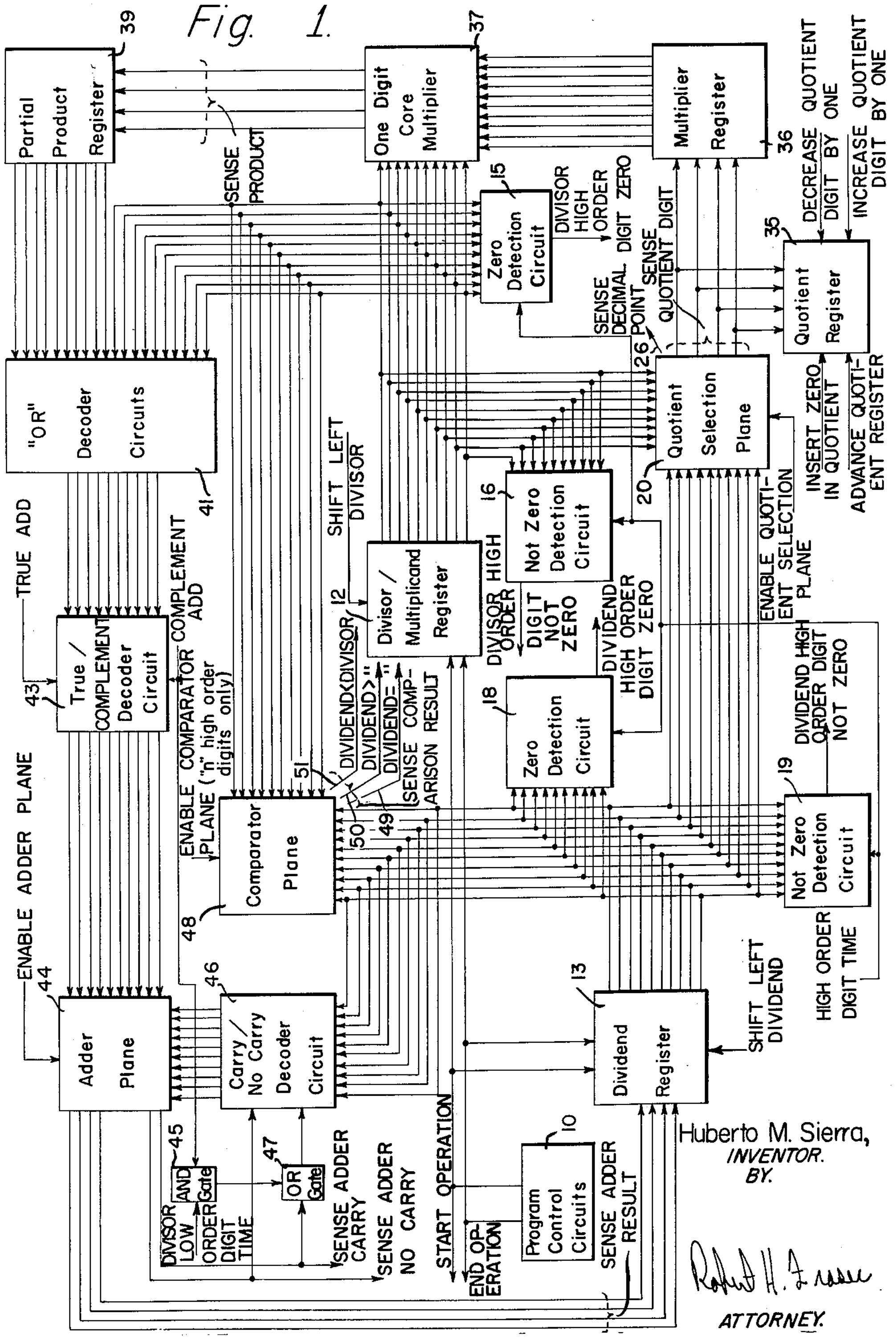
FIG. 1 is a block diagram representation of an arrangement in accordance with the present invention, showing the principal operating units but excluding certain of the program control circuitry utilized for the timing and sequencing of individual steps within a division operation.

Reference may be made to FIG. 1, which shows in block diagram form the principal operative units of a system for division in accordance with the invention. One group of circuits, termed the program control circuits 10, controls the initiation and termination of operations and the intermediate sequences by which information is transmitted successively along the different units. For simplicity, all of the circuitry for performing these functions has not been shown in the general block diagram of FIG. 1. Instead, some of the circuitry has been shown in detail in FIG. 5. The generation and existence of signals which are routinely provided in modern data processing systems have been indicated only in a summary fashion. Thus, the program control circuits 10 are indicated only as providing start operation and end operation signals to the associated elements.

The divisor and dividend quantities which are to be operated upon are in this example entered in a divisor register 12 and a dividend register 13. The register 12 for the divisor has for clarity been called the divisor/multiplicand register 12, because outputs provided from this unit also constitute the multiplicand in a multiplication step used in establishing a trial product in the division program. Both of the registers 12 and 13 provide decimal outputs, and each is capable of storing multidigit numbers and serially providing the numbers as output. Inputs may be stored in the registers 12 and 13 from an associated data processing system, which has been omitted in the drawings. The manner in which these entries are made, the manner in which digits are read out serially as needed, and the manner in which new multidigit numbers may be stored in the registers 12 and 13 is well understood by those skilled in the art and need not be further explained. Each of the registers 12 and 13 has an additional control input, which may be termed a "shift left" input, and which is utilized to, in effect, shift the numbers stored in the register one place to the left.

The dividend register 13 is additionally arranged to be reset or adjusted by binary coded decimal inputs provided from an addition operation which occurs within the division sequence. As a result of the addition, at least a portion of the count stored within the dividend register 13 may be altered to correspond to the sum resulting from the addition. Both of the registers 12 and 13 may store digits in decimal form, with binary coded decimal to decimal conversion then being used at the output, or they may store the digits in decimal form and a conversion may be made at the input of the dividend register 13.

Outputs from the divisor/multiplicand register 12 and the dividend register 13 therefore are provided as decimal signals on one out of ten output lines from each of the registers. These outputs are provided to detection circuits 15, 16, 18 and 19 which operate to generate control signals for the system. These detection circuits include paired zero and not zero detection circuits 15 and 16 or 18 and 19 coupled in parallel to the outputs of the divisor/multiplicand register 12 and the dividend register 13 respectively. Each may consist of logical gating units arranged to detect the occurrence, or to indicate the absence, of the characteristic zero signal. Each of the detection circuits 15, 16, 18 and 19 operates under control of a signal provided during high order digit times from the associated control circuitry.

Figure 2:
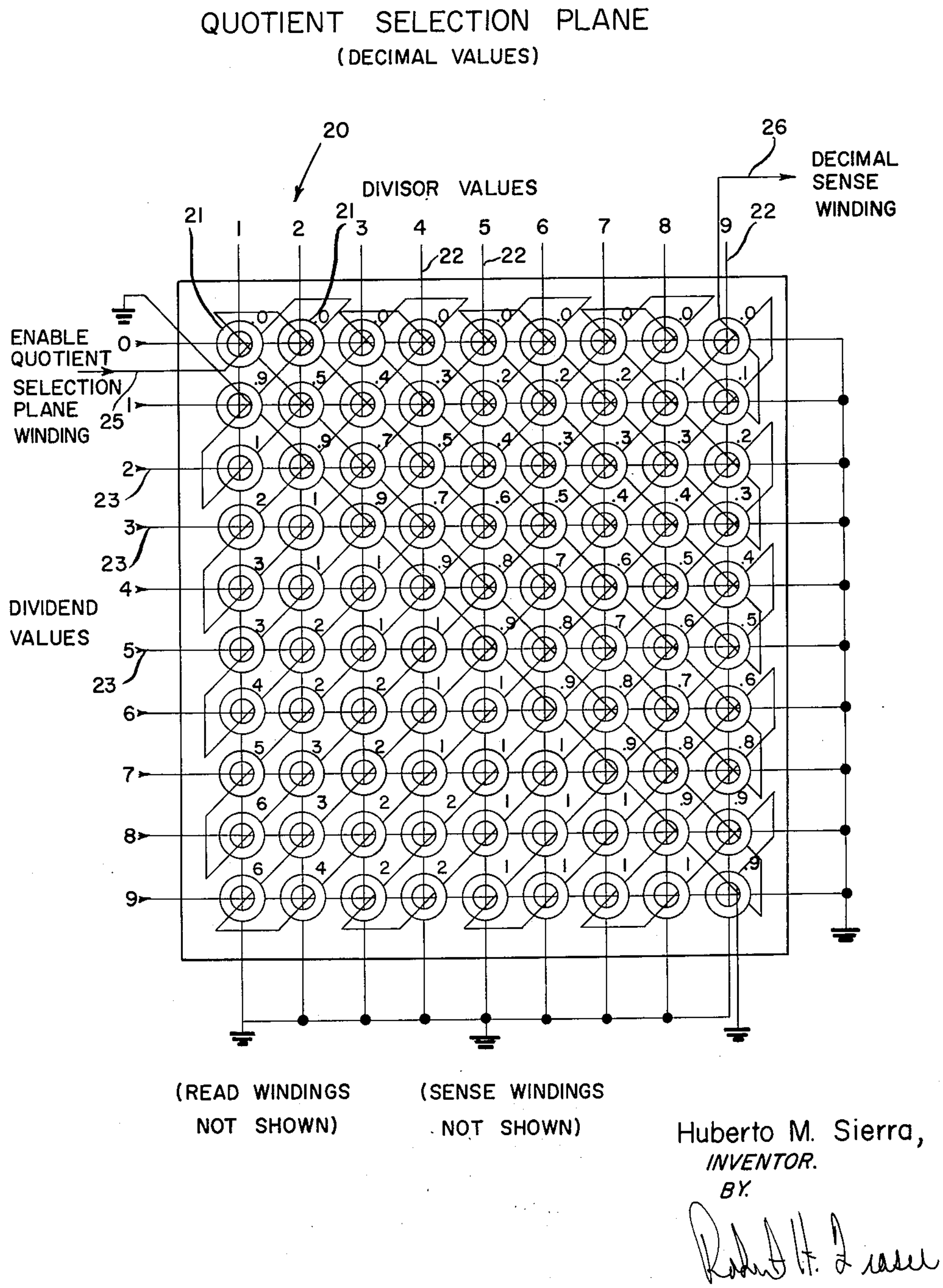
FIG. 2 is a simplified combined plan and schematic representation of a quotient selection plane which may be utilized in the arrangement of FIG. 1.

The ten outputs of the dividend register 13 and nine out of the ten outputs of the divisor/multiplicand register 12 are applied as addressing conductors to the separate coordinates in a quotient selection plane 20. Only nine lines are necessary for divisor values, inasmuch as division by zero may be omitted. Details of the manner in which the quotient selection plane 20 is arranged may best be seen in the detailed views of FIGS. 2 and 3. Referring to FIG. 2, the plane 20 consists of a rectangular array or matrix of bistable magnetic cores 21, these cores 21 having rectangular hysteresis characteristics. As is well known, proper selection of the driving current, together with the magnetization characteristics of the cores 21, causes only one core 21 to be operated for each pair of inputs provided to the matrix. The matrix is disposed in vertical columns and horizontal rows, there being nine columns corresponding to the nine divisor digits, and ten rows corresponding to the ten decimal dividend digits. The cores 21 in each of the columns are separately threaded by and inductively coupled to individual addressing conductors 22 from the group of conductors which provide the divisor values. Each of the cores 21 is likewise threaded according to the row in which it is located by a conductor 23 from the group of conductors which provide the dividend values. Thus, each core 21 lies at the intersection of an addressing conductor 22 for the divisor, and an addressing conductor 23 for the dividend and is operated, or caused to change its state of magnetization, by coincident signals on the associated conductors 22 and 23.

This change in state in the present arrangement is selectively effected under the control of a winding, here called the enabling winding 25, which threads each of the cores 21 in the quotient selection plane 20. The enabling winding 25 is coupled to ground and arranged to provide a bias magnetization which prevents operation of any of the cores 21 except during the provision of an enabling signal. To simplify the representation, a read winding utilized to return operated cores 21 to their original state and to determine the operated core has not been shown. The read winding threads each of the cores 21 serially. Nor have details as to rectifying elements or core drivers been shown, although their use, where necessary or desirable, will be understood.

Output signals are derived from the quotient selection plane 20 through utilization of the currents induced when the state of a core 21 is read. Only an operated core 21 provides a signal which can be sensed as it is returned to the original magnetization state. These output signals are derived in a binary coded form, as will be described in more detail with respect to FIG. 3, but are considered to represent a value dependent upon the position of the core 21 within the matrix. Thus, it will be seen that in FIG. 2 each of the cores 21 has an assigned decimal value, and that the decimal value may be a whole decimal number, or an integral decimal number of less than unity. Such fractional quotients are derived whenever a divisor digit is greater in magnitude than the dividend digit into which it is being divided. This fractional relationship is established by a decimal sense winding 26 which threads all those cores 21 which occupy a fractional value position.

The values which may be considered to be assigned to the various cores 21 within the quotient selection plane 20 provide a particularly advantageous feature in the present arrangement. These values represent the most probable quotient for the given divisor and dividend digits (as determined by the associated addressing conductors which intersect at a given core), under the assumption that each of the digits is the highest order in a multidigit number. While the correctness of a quotient is not fully established until certain comparisons have been made, this assignment of trial quotient values on the basis of probability can greatly minimize the number of steps needed in selecting a final quotient or in determining that the trial quotient is correct.

Figure 3:
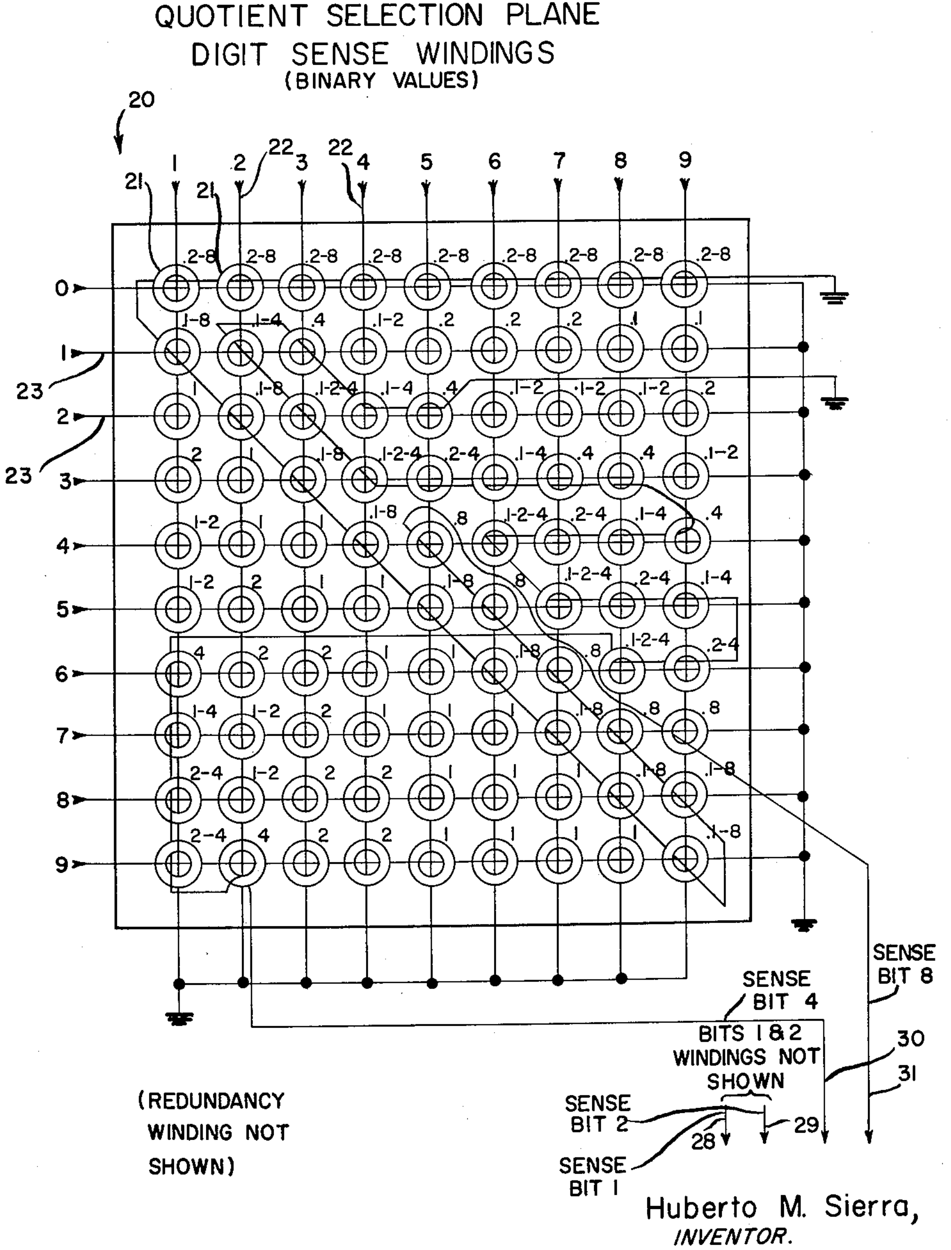
FIG. 3 is a simplified representation of the quotient selection plane shown in FIG. 2, and illustrating the manner in which binary coded quotient values are derived by various sensing windings.

To reduce the amount of sensing circuitry utilized, and to enable easier storage of trial quotient values, the quotient digits are sensed as binary coded decimal quantities. Reference may be made to FIG. 3, in which the sense windings are shown in more detail. A group of four digit sensing conductors 28–31 thread and are inductively coupled to the cores 21, in order to derive binary coded output signals representative of the quotient value assigned to an operated core. Each of the windings 28–31 corresponds to a different binary digit, or bit, so that the windings 28–31 represent successively the bit one, bit two, bit four and bit eight values, respectively. Each of the windings 28–31 serially threads all of the cores 21 which include that binary digit in their assigned values. Thus, the bit one winding 28 is inductively coupled to all of the cores 21 which contain a binary one in their assigned values. For simplicity, only the bit four and bit eight windings 30 and 31 have been shown in detail, the remaining sensing windings 28 and 29 being threaded through the cores 21 in a like fashion but with different patterns. The decimal sensing winding 26 is not shown in FIG. 3. Similarly, while a redundancy winding for a parity check has not been shown, it will be understood that such a winding may be employed if desired.

Signals representing the quotient value are coupled from the output of the quotient selection plane 20 (again referring to FIG. 1) to a quotient register 35. The quotient register 35 performs a number of functions, the principal one of which is to serially store the successive quotient digits provided during a division process. These digits then constitute the system outputs, and may be supplied to associated units (not shown) of a data processing system. The other functions provided by the quotient register 35 are dependent upon the manner in which the quotient register 35 is operated. Two separate inputs are provided for adjusting the trial quotient count, one input being for increasing the count by one and the other input being for reducing the count. Yet another input is provided for inserting a zero in the quotient, while a fourth input supplies signals which cause the entire quotient to be shifted one place in the register for the entry of a new quotient digit. Thus the quotient register 35 corresponds to a shift register for binary coded decimal digits in which the first stage is arranged to add or subtract one from the count stored therein, to receive a zero digit, and in which a separate control signal can be used to shift the quantities in the register.

The binary coded decimal outputs from the quotient selection plane 20 are also applied to a multiplier register 36, which includes means (not shown in detail) to again provide decimal outputs. These decimal outputs from the multiplier register 36 are utilized as one group of inputs to a multiplier system, which is here called a one digit core multiplier 37. In a preferred form, the one digit core multiplier 37 may consist of a number of planes of bistable elements, arranged to provide one step multiplication of successive digits, and automatic inclusion of carry between successive multiplications. Such a system is shown and described in a previously filed patent application, entitled "Multiplier System," Serial Number 818,759, filed June 8, 1959, by Huberto M. Sierra. Inputs for the second coordinate in the one digit core multiplier 37 are taken from the output of the divisor/multiplicand register 12. Product values which are derived as outputs from the one digit core multiplier 37 are applied to a partial product register 39 which provides a buffer storage for the digits from the multiplier 37 and which also converts the binary coded decimal signal patterns to a decimal output.

Outputs from the partial product register 39 and also from the divisor/multiplicand register 12 are applied in parallel to "OR" decoder circuits 41 which selectively combine these outputs into a single group of outputs for providing a subsequent addition operation. Inputs to the "OR" decoder circuits 41 are not provided concurrently, but if desired, conventional timing means may be utilized to provide outputs from the divisor/multiplicand register 12 and partial product register 39 in a selected timed sequence.

An adder circuit, here termed an adder plane 44, is arranged to have one group of inputs responsive to the outputs of the "OR" decoder circuits 41 through a true/complement decoder circuit 43. The adder plane 44 may consist of a plane of bistable elements having addressing conductors in each of two coordinates, and selecting a sum value in dependence upon the conductors which are energized in each of the two coordinates. These outputs are again provided on sense windings in a binary coded decimal form, and separate carry sensing windings are also utilized to provide signals indicative of the presence and absence of a carry in a given addition operation. An enabling signal is provided at an appropriate input to the adder plane 44 in a fashion corresponding to the like enabling signal at the quotient selection plane 20. The true/complement decoder circuit 43 selectively converts the decimal digits which are provided to it to an equivalent nines complement value. This true/complement decoder circuit 43 may thus consist of a group of gating elements, arranged to provide a true output under control of a "true add" signal, and to provide a nines complemented output under control of a "complement add" signal.

The remaining group of inputs to the adder plane 44 are supplied from the dividend register 13 through a carry/no carry decoder circuit 46. Under control of the carry and no carry signals from the adder plane 44, the carry/no carry decoder circuit 46 either provides the output of the dividend register 13 unchanged to the adder plane 44, or increases the digit value by one. The equivalent of carry control signals is also provided by a gating circuit consisting of an "AND" gate 45 and an "OR" gate 47. The "AND" gate 45 has two inputs, one responsive to the complement add signals, and the other responsive to signals indicating the occurrence of law order digit times when the divisor is being multiplied. Both the sense adder carry signals and the output of this "AND" gate 45 are coupled to the carry/no carry decoder circuit 46 through the "OR" gate 47 which isolates the units from each other. As with the true/complement decoder circuit 43, the decoder circuit 46 may consist of a group of gating elements arranged to form a network and controlled by the carry and no carry signals.

Comparisons are preferably effected in the present system by a comparator plane 48, which (as with the quotient selection plane 20, the multiplier 37, and the adder plane 44) may be made up of a coincidently addressed matrix of bistable elements. One set of inputs of the comparator plane 48 is responsive to outputs from the divisor/multiplicand register 12, and the other is responsive to the outputs of the dividend register 13. The sense windings provided separate indications of whether the dividend is less than, equal to, or greater than, the divisor.

*Operation of the System*

The system shown in FIGS. 1–3 operates in an integrated fashion to divide one multidigit decimal number by another. The division process, however, may be envisioned as involving eight functionally different phases. These phases are as follows:

(1) Zeros occurring in the divisor are detected and adjustments are made to the divisor to select the next digit for use in division.

(2) Zeros which occur in the dividend values are detected, and also utilized to control the quotient and the dividend digit used at a given step.

(3) A trial quotient is first selected by comparison of the high order divisor digit and an individual dividend digit. Initially, this will be the high order dividend digit.

(4) A trial product is formed from the trial quotient digit and the entire divisor value.

(5) A first determination as to whether the trial quotient is high or low is made by subtracting the trial product from a comparable part of the dividend to secure a first trial remainder. If the remainder is positive, the trial quotient is not too high but may be too low, while if the remainder is negative, the trial quotient is too high.

(6) With a positive remainder, the magnitude of the divisor is compared to the magnitude of the remainder, and if necessary successive adjustments are made in the remainder along with concurrent adjustments in the magnitude of the trial quotient. This is carried out until the remainder is smaller than the divisor.

(7) If the trial remainder is initially negative, the remainder is adjusted by adding the divisor value successively and concurrently revising the size of the trial quotient until the remainder becomes positive.

(8) The above phases are repeated utilizing the high order digit of the divisor and the successive digits of the dividend, until the quotient has been worked out to the number of places desired, at which time the system completes operation on the given divisor and dividend values.

An appreciation of the manner in which the system operates to provide the above phases may be had by taking an example of specific decimal values which are to be divided. Such an example is shown in the general example of a division operation which is provided in FIG. 4, which should be referred to in addition to FIG. 1. As is there set out, a dividend values of 983,578 is to be divided by a divisor of 125, and a four digit quotient is desired.

At the outset of the division operation, the divisor is set into the divisor/multiplicand register 12, and the dividend is set into the dividend register 13. In the first phase of operation, the high order digit time signal is provided to the zero detection circuits 15 and 18 and to the not zero detection circuits 16 and 19. If the divisor high order digit is zero, a signal signifying that fact is provided as an output by the zero detection circuit 15. A divisor digit of zero would result in a quotient value of infinity, so that the next succeeding divisor digit which is not zero should be utilized. Accordingly, a not zero signal is provided by the not zero detection circuit 16 to control shifting to the next digit, and the system can proceed with the division program.

In the second phase of operation, which actually may occur concurrently with the first phase, the value of the high order digit for the dividend is also sensed. The sensing again determines that a zero is not present at the high order digit place in the dividend. If a zero were the value of the high order digit, the dividend would be shifted one place to the left in order to begin operation on the first significant digit. In addition, the quotient address would also be shifted one place to the left because the high order quotient digit would in effect be zero.

Having checked for the presence of zeros, and shifted the divisor, dividend and quotient accordingly if zeros are present, the system begins the third phase, in which a trial quotient is selected in the trial quotient selection plane 20. Referring now to FIGS. 2 and 3, as well as FIG. 1, decimal-valued signals from the divisor/multiplicand register 12 and the dividend register 13 cause operation of a single core 21 within the quotient selection plane 20. For the high order divisor value of one and the high order dividend value of nine, the selected quotient is a six. The binary coded output signals provided by the sensing windings 28–31 of the quotient selection plane actually correspond to the bit two and bit four signals. The decimal sense winding 26 does not thread the core 21 which has been operated, so a decimal point signal is not sensed. Thus, the system provides a trial quotient for subsequent operations, this trial quotient being entered into the quotient register 35 as a first tentative digit.

The occurrence of a decimal point on the decimal sense winding 26 at readout time denotes that the first digit of the divisor is larger than the first digit of the dividend. Accordingly, this signal is used to control shift of the dividend one place, so that the trial product which is to be taken will be of the same order of magnitude as the portion of the dividend to which it is to be compared.

It should be noted here that as is indicated in FIG. 4 by the solid vertical lines which bracket the first three digits of the dividend, only a part of the dividend is used in subsequent division steps. The part used need only be of the same order of magnitude as the divisor. Consequently, when reference is hereafter made to subtraction from or comparison with the dividend, it will be understood that this refers only to that part of the dividend which is then under consideration. The number of digits used in the dividend corresponds to the number used in the divisor, except that at various times an additional digit may be provided at the high order place. Thus, with three digits in the divisor of the present example, only three digits in the dividend are usually needed, except that a fourth, high order digit may also be employed. The fourth digit results from shifting of the dividend, or from various carry steps in the operation.

In the fourth principal phase of the division, the trial quotient provided from the quotient selection plane 20 is used as a multiplier for the divisor value in providing a trial product. Thus, outputs from the multiplier register 36 and outputs from the divisor-multiplicand register 12 are used to address the one digit core multiplier 37, each of the registers 36 and 12 controlling a different addressing coordinate. Although the digits from the multiplier register 36 are in each case the trial quotient, the multiplicand values are the successive digits of the divisor. Consequently, the binary coded trial product from the multiplier 37 consists of a series of digit values, starting with the least significant digit first, which are successively applied to and buffered by the partial product register 39. Outputs from the partial product register 39 constitute decimal inputs for a succeeding addition process, these decimal inputs being applied through the "OR" decoder circuits 41.

The one digit core multiplier circuits 37 operate to provide the proper output digits and automatically to include the carry between successive steps. Thus, the product of 6 (quotient) times 125 (divisor) is sequentially provided as 750 to the partial product register 39, with the least significant digit first. The 750 value constitutes a trial product whose relationship to the first part of the dividend determines the sense of deviation of the trial quotient from the proper first digit for the quotient.

The fifth phase is initiated by subtraction of the trial product from the comparable part of the dividend. The subtraction is accomplished by adding the true complement of the trial product to the dividend. Each digit from the dividend is added to the nines complement of the corresponding digit in the trial product. Additionally, to change from the nines complement to the true complement, the low order digits which are first provided are additionally supplemented by a carry digit. Thus, for the low order digits, the values which are added are the three, from 983 in the dividend, the nine, from 249 (the complement of 750) in the trial product and the one, which is the carry to convert from the nines complement. A complemented value is provided from the true/complement decoder circuit 43 under control of the complement add signal, while the carry signal is provided from the carry/no carry decoder circuit 46 with the first digits in each subtraction process. The carry control signal results from the concurrent application of divisor low order digit time and complement add signals to the "AND" gate 45. The first digit from the dividend register 13 accordingly is increased by a count of one at the carry/no carry decoder circuit 46. Thus, the adder plane 44 is operated with one decimal value of nine and another decimal value of four and provides an output of three plus a carry. The binary coded value of three is applied back to the dividend register to change the value of the lowest order digit in that portion of the dividend to a three. Readout is accomplished following the enable adder plane signals at the desired time. The carry signal resulting from the addition controls the carry/no carry decoder circuit 46 until such time as the next succeeding digits are provided and either a carry or no carry signal is provided.

The subtraction process is carried through until the final result of 233 plus a carry is obtained. This result then constitutes a trial remainder for the dividend. In a sense, the remaining digits of the dividend, 578, may also be considered to be part of the trial remainder, but the significant initial part at this point in the division is the first three digits of the dividend as revised into a trial remainder.

When the complement of a numerical value is added to another numerical value of a like number of digits, the presence or absence of a carry is an indication of the relative magnitude or rank of the two numbers. If the number which was complemented were the same as the number to which the complement is being added, the result would be a carry followed by a succession of zeros, which would indicate equality between the numbers. When a carry is present and accompanied by integral digits, therefore, this is an indication that the trial product is smaller than the portion of the dividend from which it is being subtracted. Thus the remainder is positive. Conversely, when no carry is present, the trial product is established as larger than the comparable portion of the dividend, and the remainder is negative. These relationships may therefore effectively be used to control succeeding steps in the division sequence. By inspection, it is apparent that the result of adding the complement of 750 to 983 is 233 plus a high order carry, and that this constitutes a positive trial remainder.

The subsequent phases of the division program are controlled by the presence or absence of the carry in the preceding, fifth, phase. Although the sixth and seventh phases are considered separately, it will therefore be understood that they are used alternatively, depending upon the relationships previously derived with respect to the carry.

Where, as in the present example, the trial remainder is positive (the trial product is smaller than the comparable dividend part), it is necessary first to determine in the sixth phase that the trial remainder is less than the divisor. Clearly, if the first digit of the trial remainder is zero, then the trial remainder will be less than the divisor, because there are a like number of digits in the trial remainder and the divisor. The presence of a zero-valued trial remainder high order digit is detected during the high order digit time by the zero detection circuit 18 which is coupled to the output of the dividend register 13. If a zero is detected, the signal is used at the shift left input of the dividend register 13, to shift the dividend one place to the left, and at the advance input of the quotient register 35 to prepare the system for sensing the most probable trial quotient for the first digit of the divisor and the next succeeding digit of the dividend. In the present example, the sixth phase continues with determination of the magnitude relations of the trial remainder and the divisor.

Still as a part of the sixth phase of the division, under the given conditions there is a comparison of the magnitudes of the trial remainder and the divisor. In this comparison, the trial remainder of 233 which was obtained is to be compared with the divisor value of 125. Beginning with the most significant digits first, the divisor/multiplicand register 12 provides the divisor and the dividend register 13 provides the trial remainder. These signals energize pairs of conductors, one in each coordinate, at the comparator plane 48. Under control of the enabling and readout signals, the comparator plane 48 senses the relative rank of the digits being applied, and provides indications of equality until a first intequality relationship is derived.

When the trial remainder of the dividend is smaller than the divisor, as determined by the comparison, then the trial quotient is correct, the quotient address is shifted one place to the left and a new trial quotient may be selected at the third phase of the sequence. Note that no adjustment or change of the remainder is needed in order to proceed to the selection of the new quotient digit. If the trial remainder is larger than or equal to the divisor, however, an adjustment is made in the trial remainder and also in the trial quotient. Here the result of the comparison is that the trial remainder (233) is larger than the divisor (125). The quotient digit is increased by one from six to seven, by applying an increase quotient signal to the quotient register 35. The divisor value is subtracted from the trial remainder by adding the true complement of the divisor to the trial remainder. This entails provision of the comparable digits from the dividend register 13 and the divisor/multiplicand register 12 to the adder plane 44. As previously described, the lowest order digits are accompanied by a carry, as controlled by the "AND" gate 45, the "OR" gate 47, and the carry/no carry decoder circuit 46, and the complemented value is provided under control of a complement add signal to the true/complement decoder circuit 43. Again, selected elements in the adder plane 44 are operated in sequence under control of the enabling signal, and during readout the adder plane 44 provides a sequence of binary coded signals representative of the sum of the trial remainder and the true complement of the divisor. In adding the complement of the divisor, or 875, to the trial remainder, or 233, the result is 108 plus a high order carry. Again, there is a positive remainder, but this new trial remainder must once more be compared again to the divisor. Consequently, the sixth phase for the present example concludes with another comparison of the magnitudes of the trial remainder and the divisor. When this comparison step is repeated it is clear, as shown in the example, that the new remainder of 108 is less than the divisor of 125, and that the trial quotient is now correct.

The seventh phase (not used at this juncture in the example) deals with the condition in which no carry is present after the subtraction of the fifth phase, so that the trial remainder is found to be a negative quantity. If there is no carry, a signal is applied to the decrease count input of the quotient register 35, so as to decrease the quotient digit by one. At the same time, the divisor is added to the trial remainder, by providing the divisor digits from the divisor/multiplicand register 12 and the trial remainder digits from the dividend register 13 to the inputs of the adder plane 44. These inputs are applied respectively through the true/complement decoder circuit 43, which is operated by true add signals to provide the true input to the adder plane 44, and by the carry/no carry decoder circuit 46, which is operated in a no carry state because of the absence of a carry signal from the adder plane 44. Again, the signals are provided sequentially, the least significant digit first, until the addition is complete.

The addition of the divisor to the trial remainder may not bring the trial remainder to a positive quantity, so that if no carry is provided after the addition, the addition of the divisor must again be made, and the quotient digit again increased by one in the manner above described. When the addition ultimately results in a carry, the remainder is then positive, and the trial quotient is correct. The sixth phase is repeated, however, in order to accomplish shifting of the dividend and advancing of the quotient address. If the high order digit of the trial remainder is zero, the dividend may be shifted one place to the left immediately and the quotient address advanced, for operation on the next dividend digit. If the high order digit of the trial remainder is not zero, a comparison is made, which establishes that the divisor is larger than the trial remainder, and the dividend and the quotient address may again be shifted.

This division cycle is completed by detecting the desired number of quotient digits which are obtained. Here the desired four places in the quotient may be detected by comparing the quotient digits obtained at each step with the desired number in an associated device (not shown) and indicating completion of the operation by the program control circuits 10 by the provision of an "end operation" signal.

Although the complete cycle of eight phases above described fully sets out the various alternatives in a division program, a brief summary of the remaining steps in the illustrative example will aid in understanding the alternative sequences. Thus, after the second trial remainder of 108, plus a high order carry, is provided, the system again returns to the third phase, wherein a trial quotient is selected for the next digits. Here the first digit (one) of the trial remainder 108 and the first digit (one) of the divisor are compared in a quotient selection plane to provide a trial quotient of .9. The fractional value of this trial quotient results in a sense decimal point signal on the sense decimal winding 26 shown in detail in FIG. 2. The sense decimal signal is utilized immediately to shift the dividend in its entirety one place to the left, the trial remainder now becoming a four digit number. In order to test the validity of the nine value as a second trrial quotient digit, the fourth and fifth phases (multiplication of the trial quotient by the divisor and subtraction of the trial product from the dividend) are again repeated. The new trial product is now 1125 and the nine complement thereof is 8874. When the digits are added successively, including a carry to correct for the nines complement at the lowest order digits, the result is a trial remainder after the fifth phase of 9960, without a high order carry. The absence of a high order carry indicates a negative remainder, so that the divisor is added to the trial remainder, and the trial quotient decreased by one. Still in the seventh phase, therefore, the trial quotient is reduced to 78 and the divisor is added to the trial remainder to provide a new trial remainder of 0085 and a high order carry.

Upon repeating the sixth phase following the occurrence of a carry signal, it is determined that the high order digit is a zero. Thus, the divisor is immediately known to be greater than the trial remainder, and the dividend is immediately shifted to the left one place.

For the determination of the third digit in the quotient, the high order digit (eight) of the new dividend 57 is compared with the first digit one of the divisor, and as may be seen in FIG. 2, this gives a trial quotient of 6. In the fourth phase, therefore, the trial quotient (six) is multiplied by the divisor 125 to give a trial product of 750. As with the first step, the trial product is complemented and added, along with the carry, to the dividend, providing a third trial remainder of 107 plus a carry. Again, the sixth phase operation compares the trial remainder 107 with the divisor, 125, to reveal that the divisor is greater, so that the trial quotient is actually correct. At this point, therefore, three out of the desired four digits (the quantity 786) for the quotient have been determined.

The last trial quotient is selected by again utilizing the one from the new dividend of 107 and a one from the divisor of 125, to give a .9 value from the quotient selection plane 20 of FIG. 1. The decimal point sensed in the output causes the immediate shift of the dividend one place to the left, thus completing the third phase for the final digit. Again, in the fourth and fifth phases the value of 9 is multiplied by the divisor to give 1125, which is nines complemented to give 8874. When the new trial product is again subtracted from the revised dividend, the result is 9953, without a high order carry, which condition initiates operation of the seventh phase to eliminate the negative remainder. Accordingly, the quotient is reduced by one to 7868 and the divisor is added to the trial remainder. As may be seen in the example, the first addition of the divisor to the trial remainder gives a final remainder of 0078 plus a carry. The presence of the carry and a high order digit of zero signifies the correctness of the final digit.

Inasmuch as the final digit, which makes the total quotient 7868, is the fourth digit, the occurrence of the total desired number of digits is sensed and the operation is completed by the provision of an "end operation" signal from the program control circuits 10.

*Program Control Circuits*

The principal phases in the division operation, and the sequences within the individual phases, are controlled by the program control circuits 10 of FIG. 1. A detailed diagram of one network which might be utilized to provide these signal patterns is provided in FIG. 5, to which reference may now be made. This network consists of a number of logical gating circuits arranged in a fashion to provide desired control signals in response to the occurrence of selected signal patterns within the system. The logical gating circuitry includes "AND", "OR" and trigger circuits of the type commonly employed in electronic data processing systems. In accordance with conventional usage, an "AND" or coincidence gate has more than one input and provides output signals on the coincident applications of signals to each of its inputs. An "OR" gate, sometimes called an anticoincidence gate, has more than one input and provides an output signal when ony one of its inputs is energized. A trigger circuit is a bistable device, such as a bistable multivibrator, which has two inputs and two outputs. The trigger circuit provides a different steady state output signal in response to signals applied to each of the inputs.

It is assumed in the present example that "start operation," read and reset signals are provided by the associated system. The "start operation" signal is provided at the beginning of each division program. The reset signals are provided each time a trial quotient value has been determined to be correct. Read signals are used at fixed times after the enabling signals, to sense the cores which have been operated. Inasmuch as these signals are functions of the associated system, and may be provided as in existing practice, further implementation need not be discussed. Similarly, the system provides a high order digit time signal prior to the selection of each new trial quotient and a divisor low order digit time signal, as was previously discussed in conjunction with FIG. 1.

In addition to the reset, start operation, and high order digit time signals, the inputs provided from the various elements within the system of FIG. 1 are as follows:

(1) Divisor high order digit zero signal.
(2) Sense dividend<divisor signal.
(3) Sense decimal point signal.
(4) Dividend high order digit zero signal.
(5) Divisor high order not zero signal.
(6) Sense adder carry signal.
(7) Dividend high order digit not zero signal.
(8) Sense dividend>divisor signal.
(9) Sense dividend=divisor signal.
(10) Sense adder no carry signal.

These signals are provided from the individual units of FIG. 1. For example, the signals which indicate that the high order digit of the divisor or dividend is zero or not zero come from the various detection circuits 15, 16, 18 and 19. The signals which indicate equality or the relative sense of the inequality between the dividend and the divisor come from the comparator plane 48, while the sense decimal point signal is derived from the quotient selection plane 20 and the carry and no carry signals are provided from the adder plane 44. The network of logical gating circuits and elements operates upon these signals in integrated fashion to provide the output signals needed to continue the division operation. In response to the various conditions existing at each step, the present circuitry provides a simple but effective and economical arrangement for providing the desired signal patterns for establishing the next step. A brief discussion of each of the signals which is provided, and its significance in contributing to the program, will provide a useful review of the operative features of the system.

The "shift left divisor" signal is utilized in the system only to prevent attempted division by a high order divisor digit of 0. Accordingly, the shift left divisor signal is generated by a first "AND" gate 55 in response to coincident start operation and divisor high order digit zero signals. On starting division, in order words, the divisor is shifted left and a new digit is used if the high order digit of the divisor is a 0.

"Advance quotient register" signals may be provided whenever it is desired to start to find a new quotient digit. A new quotient digit is needed whenever the dividend or divisor high order digit is a 0 and the dividend or divisor is accordingly shifted, and when a trial quotient has been determined to be correct. Thus, the shift left divisor signal is utilized to provide one input to a first "OR" gate 56, the output of which constitutes the advance quotient register signal. A second input of the first "OR" gate 56 is activated by outputs from a second "AND" gate 57, one input of which is responsive to the sense dividend<divisor signals from the comparator plane of FIG. 1. The remaining input of the second "AND" gate 57 is responsive to enable comparator plane signals, the generation of which is described in more detail below. The two signals applied to the second "AND" gate 57, however, indicate that the trial remainder in a dividend is less than the divisor, so that the trial quotient which has been adopted is determined to be correct.

A third input to the first "OR" gate 56 is provided from the output of a third "AND" gate 59 which respond to "start operation" signals and dividend high order digit zero signals to indicate by an output that the dividend has to be shifted to the left, the quotient is also to be advanced, so that the output of the third "AND" gate 59 is utilized to establish this concurrent function. The fourth and last input to the first "OR" gate 56 is provided from the output of a fourth "AND" gate 60. The two inputs to the fourth "AND" gate 60 constitute the dividend high order digit zero signals and the sense adder carry signals. These two signals establish that there is a positive trial remainder and, because of the initial zero in the trial remainder, that it is of a lower value than the divisor, so that the trial quotient is correct. Accordingly, the first "OR" gate 56 provides advance quotient register signals for each of the four different conditions of operation of the system which were previously discussed.

"Shift left dividend" signals are not provided immediately upon the selection of each trial quotient but are generated by a second "OR" gate 62 whenever needed for proper comparison, addition to or subtraction from the trial remainder. Thus, the shift left dividend signal is provided from the second "OR" gate 62 whenever the sense decimal point signal occurs alone as a result of the selection of a trial quotient. The shift left dividend signal is also provided from the fourth "AND" gate 60 output, which is one indication that the trial quotient is correct, and from the third "AND" gate 59 output, which indicates the high order digit of the dividend is a zero.

"Insert zero in quotient" signals are also provided by the outputs of the third "AND" gate 59. Thus, the output of the third "AND" gate 59 concurrently causes the quotient register to be advanced, the dividend to be shifted left, and a zero to be inserted in the quotient.

"Enable quotient selection plane" signals are provided from a fifth "AND" gate 63 in response to coincident divisor high order digit not zero and dividend high order digit not zero signals. Thus, the quotient selection plane is enabled whenever the divisor and the dividend have both been shifted to the left to a point at which the high order digits are a significant value other than zero.

Control of the comparator plane is provided by "enable comparator plane" signals provided by one output of a comparator control trigger 65. This output may be designated an "ON" output and the corresponding input may be activated by outputs from a sixth "AND" gate 66. The two inputs which activate the sixth "AND" gate 66 are the sense adder carry signals and the dividend high order digit zero signal. When these two signals occur together they indicate the presence of a positive trial remainder during a division sequence, and enable the comparator plane until the next succeeding "reset" signal is provided when the comparison is complete.

The enable comparator plane signal is also utilized in two other ways. First, as described above, it is applied to the second "AND" gate 57 as one input in generating an advance quotient register signal. Second, it is also applied to one input of a seventh "AND" gate 68. The remaining input of the seventh "AND" gate 68 is responsive through a third "OR" gate 69 to both the sense dividend>divisor signal and the sense dividend=divisor signal. This condition signifies that when the trial remainder is equal to or greater than the divisor, the adder plane is also to be enabled and the quotient digit is to be increased by one. These results are achieved by a fourth "OR" gate 70 coupled to the output of the seventh "AND" gate 68 and providing an "enable adder plane" signal, and also by a direct coupling from the seventh "AND" gate 68 output to provide an "increase quotient digit by one" signal.

"Decrease quotient digit by one" signals are provided directly from the output of an eighth "AND" gate 72 which is responsive to the high order digit time signals and the sense adder no carry signals. Whenever a trial remainder has been established, therefore, and the remainder is negative, the trial quotient digit is decreased by one during each high order digit time.

Outputs from the eighth "AND" gate 72 also are applied to the fourth "OR" gate 70 to provide the "enable adder plane" signals, because the adder plane is to be operated next following the decrease in the quotient digit.

The remaining signals which are generated within the system are the "true add" and the "complement add" signals for the control of whether the divisor is to be added or subtracted from the trial remainder, or when the trial product is to be subtracted from the dividend. These results are accomplished by the above circuitry and in addition by a true/complement control trigger 74 and a fifth "OR" gate 75. The true add signal is provided on one output of the true/complement control trigger 74, and the complement add signal is provided on the other output. Outputs from the fifth "OR" gate 75 set the trigger 74 in the complement add state when an output is provided from the seventh "AND" gate 68, when a start operation signal is provided, or when a reset signal is provided. The true add signal is provided from the true/complement control trigger 74 in response to signals from the eighth "AND" gate 72. Thus, the true/complement control trigger 74 generates the signals which assure that a trial product is subtracted from the dividend and determine whether a divisor value is to be added to the trial remainder or subtracted therefrom.

The program control circuits 10 of FIG. 1 which are illustrated in FIG. 5 therefore provide an integral control by which the various parts of the division operation are accomplished in orderly sequence. At each point in the operation, the conditions which exist determine the alternative course to be taken in the same or next phase, which is then initiated correctly.

*Steps Occurring Within the Different Phases*

Figure 6:
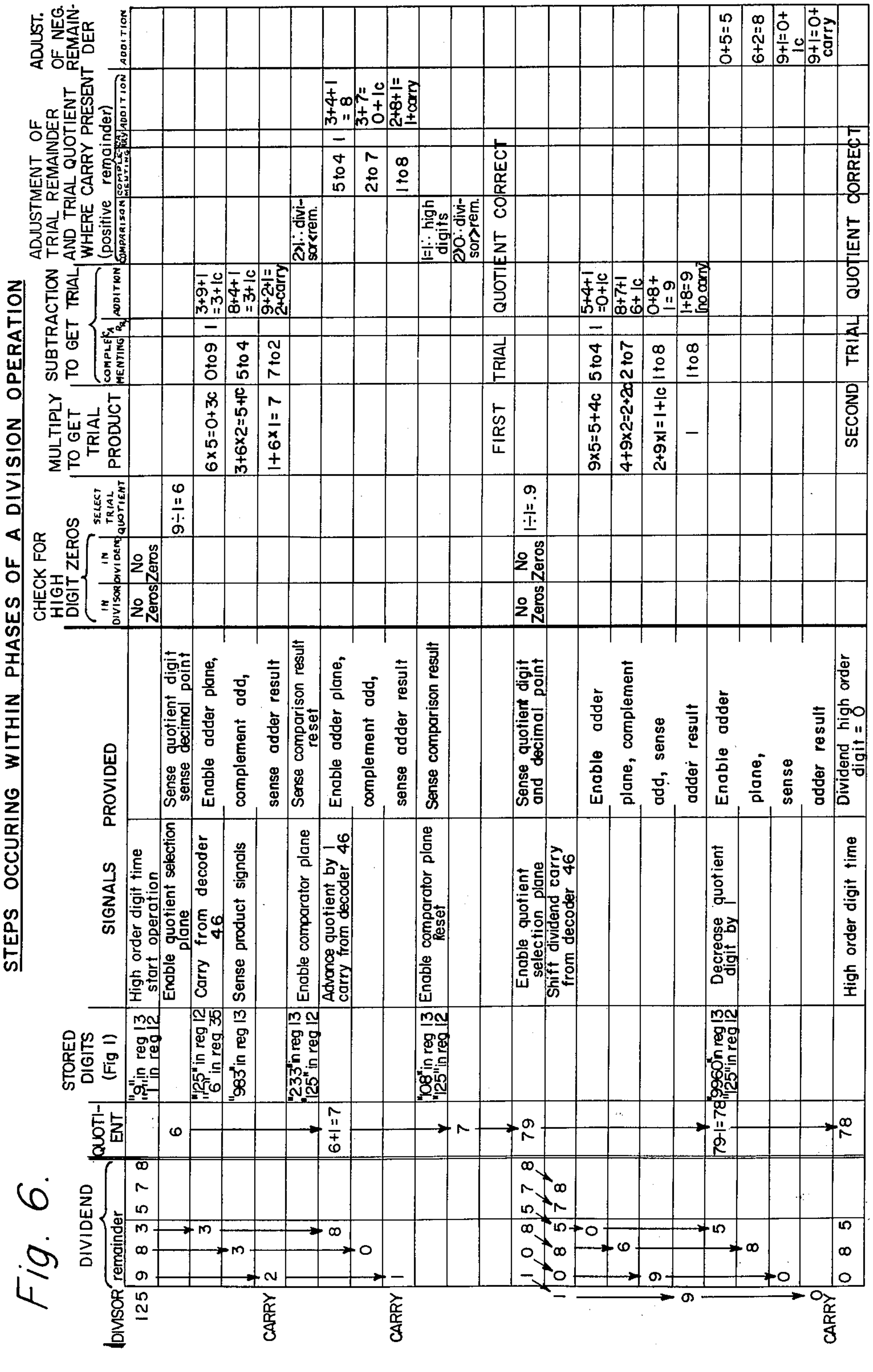
FIG. 6 is a chart dealing with a portion of the illustrative division shown in FIG. 4, but further exemplifying the manner in which the various individual steps are accomplished during each of the phases of a division operation.

In FIG. 6 is provided an example of the manner in which the individual steps within the various phases are carried out by the system. The detailed example which is given is the same as is used with respect to FIG. 4, but is extended only through the selection of the first two digits of the quotient. The various phases of the division operation may be seen to consist of serially performed steps which carry each phase to completion before passing on to the next phase of the division process.

In addition to FIG. 6, reference may also be made to FIGS. 1, 4 and 5, inasmuch as these FIGURES provide the context for the present detailed example. The chart of FIG. 6 shows the divisor and dividend values corresponding to the example of FIG. 4, and also includes the changes made in the dividend value as the dividend is successively reduced and adjusted. In the next column, labeled "Quotient," is shown the resultant sequence in which quotient digits are selected and adjusted to a final value. In the next succeeding column, labeled "Stored Digits", are to be found the digits and the registers in which they are stored in the arrangement of FIG. 1 during successive individual steps of a division operation. The following column, "Signals Provided", lists the control signals provided by the arrangement of FIG. 5 at each of the serial steps within the sequence. The remaining columns on the right hand side of the chart show the steps which occur within the various phases. These phases correspond to the like phases of the example of FIG. 4. It is to be noted, however, that the first two phases of checking for zeros in the divisor and dividend have been grouped together and that the final phase, determining the provision of the desired final number of digits in the quotient, has not been included because the example only extends to the first part of an operation.

*Selection of First Quotient Digits*

For the example given, therefore, in the first two phases the high order digit time signals and the "start operation" signal are used to detect the fact that no zeros are present in the divisor and dividend high order digits, and the enable quotient selection plane signal is provided by the program control circuits of FIG. 5. Thus, the third phase, selection of a trial quotient, is initiated and immediately followed by sense quotient digit and sense decimal point signals provided wtih a fixed time delay after the occurrence of the enabling signal.

The fourth phase, which is a multiplication of the divisor by the trial quotient to give a trial product, therefore begins with the successive provision of the divisor digits concurrently with repeated provision of the trial quotient digit to the multiplier system 37 of FIG. 1. As these digits are provided in pairs to the multiplier 37, they are followed by the sense product signals, which apply them successively to the true/complement decoder circuit 43 of FIG. 1 and to the carry/no carry decoder circuit 46 of FIG. 1 respectively. Thus, the digits of the trial products are provided serially to the subtraction system.

In the fifth phase, subtraction to get the trial remainder, there is included the substantially concurrent complementing of the trial product and the addition of the complemented value to the dividend to get a trial remainder.

Complementing is controlled by the complement add signal provided from the program control circuits. During the entry of the low order digits into the adder plane 44 of FIG. 1, the carry/no carry decoder circuit 46 of FIG. 1 is activated to apply a carry signal so as to compensate for the nines complement and to provide a true complemented value. As the complemented trial product digits and the digits of the portion of the dividend are being provided together in pairs, the adder plane 44 of FIG. 1 receives enable adder plane signals, followed by sense adder result signals. Thus, the digits of the new trial remainder are formed serially and reentered into the dividend register 13 of FIG. 1.

The subtraction phase results in the provision of the carry signal, and the resultant sensed adder carry output signal turns the comparator control trigger 63 of FIG. 5 "on" to initiate the comparison step which begins the sixth phase of operation for a positive trial remainder. Following the enable comparator plane signals, the comparator plane 48 of FIG. 1 is read and reset. The comparison result in this instance is that the divisor is less than the remainder, so the quotient is advanced by one, by the circuitry of FIG. 5, and the phase continues with the subtraction of the divisor from the trial remainder. At this point, therefore, the trial remainder is a value of "233" and the trial quotient has been adjusted from an original count of 6 to a value of 7. In the sixth phase there is a complementing to provide a nines complement and the addition of this nines complement, together with an initial carry digit, to the remainder is accomplished. The addition is provided in the same manner as is set out in the fifth phase. The result is a reduction of the remainder to a value of 108, with a carry. Again, the provision of a sense adder carry signal to the control circuits of FIG. 5 actuates the comparator control trigger 65 to provide enable comparator plane signals, followed by sense comparison results and reset signals. The digits are provided successively until final equality or an inequality is reached. In this case, the second digits, in order of significance, establish that the divisor is greater than the remainder, so that the first trial quotient digit has not been established as correct.

*Second Trial Quotient Digit*

Selection of the second quotient digit for the given example provides a somewhat different operating routine, and accordingly illustrates a number of different sub-sequences within the phases. The selection of the digit begins with the third phase, with the enable quotient selection plane signals from the program control circuits. The value selected is a .9, so that a corresponding valued signal and also a decimal point signal are provided from the quotient selection plane 20 of FIG. 1 when the quotient value is sensed. Accordingly, in the next step the sense decimal point signal causes the shift left dividend signal to be provided from the program control circuits, following which the system proceeds with the fourth and fifth phases, in which the divisor is multiplied by the trial quotient to get a trial product, and the trial product is subtracted from the dividend to provide a trial remainder. Inasmuch as this sequence is the same as described above, it need not be discussed in further detail. The result is a new trial remainder of 9960, without a carry.

In the absence of a carry, therefore, the system proceeds to the seventh, instead of the sixth, phase due to the presence of a negative remainder. The sense adder no carry signal provided during the high order digit time activates the true/complement control trigger 74 (FIG. 5) so as to provide the "true add" output signal to control the true/complement decoder circuit 43 of FIG. 1. No comparison is made in this phase. Instead, the divisor value is added to the current trial remainder to provide a new trial remainder of 0085 plus a carry. The negative remainder has therefore been converted to a positive trial remainder, and the system again reverts to the sixth phase, in order to achieve proper shifting of the dividend. The second trial quotient is determined to be correct, because during the high order digit time the dividend high order digit zero signal provides a shift left dividend output signal from the program control circuits, and also acts to initiate the enable quotient selection plane for the next succeeding trial quotient digit to be selected.

*Conclusion*

It will now be appreciated that the use of a quotient selection plane utilizing a matrix of bistable elements provides a simple but rapid system for selecting the digits for the quotient in a division operation. The values selected for the digits in the quotient selection plane correspond to the most probable values to be encountered for given divisor and dividend digits which are assumed to be the most significant digits in multidigit numbers. Each quotient digit is first selected in a one step process, and may be determined to be correct very rapidly, so that the next succeeding step may be undertaken quickly.

It will also be apparent that systems have been provided in accordance with the invention which provide a number of features. Each of the principal elements within the system provides an essentially one step operation on the digits which are being multiplied. While the multiplication of one multidigit number by a trial quotient could in itself be an extremely lengthy and complicated process, the present system has obviated in large measure the need for an extensive or lengthy multiplication sequence. Similarly, the subtraction of divisors from the trial remainder could require an extensive subtraction process programmed independently. In the present system, however, these functions are provided in an integrated fashion so that the results are made available substantialy concurrently with the multiplication.

A particularly significant feature which should be noted is that the comparison of the trial remainder to the divisor permits direct use of the remainder, if it is correct, in succeeding steps. A number of systems are known in which successive subtractions are used in order to determine whether a positive remainder is less than the divisor. These systems, however, effectively destroy the remainder value, so a further adjustment must be made before the division can proceed. Here, systems in accordance with the invention incorporate the comparison unit in such a way that no further adjustment is needed when the trial quotient is determined to be correct. As a result, no restore operation is needed, and there is a considerable saving in time of processing.

In similar fashion, the comparator plane is utilized in unified fashion together with the remainder of the elements so as to operate with a minimum of external control. These principal operating elements, together with program control circuits, provide automatic progression of the system through the individual steps of each phase, and also provide automatic selection of alternative phases and determination of when the selection of a trial quotient is complete. It is important to note that there are further provided a number of additional features by which the steps needed for completion of a division operation are minimized. Thus, the true-complement decoder circuit and the carry/no carry circuit are arranged in such a way as to permit several different alternatives of operation without requiring additional time. In like fashion, considerable time is saved in the successive operations by utilizing only that portion of the dividend which is comparable to the number of digits in the divisor. By the use of this technique the number of multiplications and additions which are needed for a given division operation may be greatly reduced. Other short cuts within the system, such as the use of high order digits of zero in the trial remainder to control going to the next trial quotient, further help to reduce the number of steps needed.

It will further be evident that a division system in accordance with the present invention provides great versatility for arithmetic units for digital data processing systems. The multiplier, adder and comparator planes which are employed may be used individually for their own functions and for independent purposes. Such dual use of these units minimizes the amount of equipment which is needed in the arithmetic unit, but at the same time allows the division routine to be performed substantially automatically.

Although there have been described above and illustrated in the drawings particular arrangements of the invention for dividing one multidigit number by another multidigit number in particularly rapid fashion through the use of planes of bistable elements arranged to perform mathematical functions, it will be appreciated that the invention is not limited to the specific illustrative arrangements. Accordingly, any modifications, variations, or equivalent arrangements falling within the scope of the annexed claims should be considered to be a part of the present invention.

What is claimed is:

1. Apparatus for division including in combination a trial quotient selection matrix having inputs controlled by the first significant digit of a divisor and successively selected individual digits of a dividend, the trial quotient selection matrix providing therefrom a trial quotient signal representative of the probable division result for numbers beginning with the two input digits, means for multiplying the divisor by the trial quotient, to provide a product, means for selectively complementing the product thus provided, means for providing a trial remainder by addition of the selectively complemented product of the trial quotient and the divisor to a comparable part of the dividend, means for determining the sense of the trial remainder, a circuit for adjusting the trial quotient value and trial remainder value in integral steps by adding the divisor to the remainder in a sense controlled by the sense of the trial remainder, the circuit for adjusting including comparator means for determining when the trial remainder is positive and less than the divisor, and the system also including circuits coupled to the trial quotient selection matrix for reinitiating division with the first significant digit of the divisor and a new dividend digt.

2. Apparatus for division including in combination a trial quotient selection matrix having inputs controlled by the first significant digit of a divisor and successively selected individual digits of a dividend and providing a trial quotient signal, a circuit responsive to the trial quotient signal and to the divisor value for providing a selectively complemented product therefrom, means responsive to the product for providing a trial remainder by addition of the selectively complemented product of the trial quotient and the divisor to a comparable part of the dividend, and a circuit for adjusting the trial quotient value and trial remainder value in integral steps by changing the value of the trial quotient by one and adding the divisor to the remainder in a sense controlled by the sense of the trial remainder, the circuit for adjusting including comparator means for determining when the trial remainder is positive and less than the divisor.

3. Apparatus for division including in combination a trial quotient selection matrix having inputs responsive to single digits from each of a divisor and dividend and providing operation of a selected element in the matrix in accordance with a probable result in the division, a circuit for determining the sense of correction needed for the trial quotient from the sense of a trial remainder, including means responsive to the trial quotient value and to the divisor value for providing a multiplied trial product value and means responsive to the trial product value for subtracting the trial product value from a comparable portion of the dividend, to provide a trial remainder, the system also including circuits for adjusting the value of the trial quotient and the trial remainder by integral steps dependent upon the sense of the results of the subtraction of the trial product from the comparable portion of the dividend, the circuits for adjusting including means responsive to the trial remainder, the comparable portion of the dividend and the value of the divisor for additively combining the divisor with the remainder in an appropriate sense until there is provided a positive remainder which is smaller than the divisor, and the system also including means for repeating the division operation successively with a single digit from the divisor and a single digit from the remainder.

4. Apparatus for division including in combination a trial quotient selection matrix having inputs responsive to single digits from each of a divisor and dividend and providing an output representing the most probable quotient digit for multidigit numbers beginning with the two digits which are provided, a circuit for determining the sense of correction needed for the trial quotient, the circuit including means responsive to the trial quotient value and to the divisor value for providing a trial product value, and means responsive to the trial product value for subtracting the trial product value from a part of the dividend which is comparable in magnitude to the divisor, thus providing a trial remainder, the system also including circuits for adjusting the value of the trial quotient and the trial remainder by integral steps dependent upon the sense of the magnitude relationship between the trial product and the comparable portion of the dividend, with the circuits for adjusting including comparator means for determining when a trial remainder is positive and less than the divisor.

5. A divider circuit comprising a circuit responsive to multidigit divisor and dividend values for providing a trial quotient from the relationship of one selected divisor digit and one selected dividend digit, a multiplier circuit for providing a trial product value signal responsive to the value of the trial quotient and the whole divisor, an adder circuit, means for applying the complemented value of the trial product with the value of a part of the dividend which is comparable in length to the divisor to the adder circuit to effect a subtraction, and control circuits responsive to the results of the subtraction and the value of the divisor for adjusting the value of the trial quotient therefrom, the control circuits including means for successively providing selectively complemented divisor values to the adder circuit to adjust the results of the subtraction, the complementing being controlled by the sense of the adjusted results of the subtraction, comparator means for terminating the adjustment when the results of the subtraction are adjusted to be positive and less than the divisor.

6. Circuits for dividing one multidigit number by another multidigit number comprising a matrix of bistable elements including a number of addressing conductors in each of two coordinates, the individual conductors in each of the coordinates being responsive to divisor and dividend values respectively, so that each of the elements corresponds to a quotient for a unique divisor-dividend relationship, the matrix also including sensing circuits threading the elements serially in selected pattern to provide trial quotient signals for each divisor and dividend value which correspond to the most probable quotient digit therefor, the circuits for dividing including circuits responsive to the trial quotient and to the divisor value for providing a trial product therefrom, adder means, means for selectively complementing values applied to the adder means, circuits responsive to the trial product and to a portion of the dividend for providing a complemented trial product with a portion of the dividend to the adder means to provide a trial remainder constituting the new dividend, a circuit responsive to the sense of the trial remainder for providing the divisor in a controllable sense with a part of the new dividend to the adder means, thus to adjust the trial remainder, a circuit responsive to the sense of the trial remainder for adjusting the value of the trial quotient by integral steps, and control circuits responsive to the results of the addition of the complemented trial product with a portion of the dividend for controlling the sense of the addition of the divisor with the portion of the dividend and for concurrently adjusting the trial quotient in a selected sense.

7. Apparatus for selecting a trial quotient in a system for division including in combination a rectangular matrix of magnetic cores, the magnetic cores being arranged in columns and rows, input conductors arranged in two groups, each conductor in a group representing a different decimal digit for the group and each threading all the cores in a different one of the columns or rows, a number of output windings serially threading the cores which represent a different selected binary value, the cores being assigned values which correspond to the most probable quotient for numbers beginning with the associated divisor and dividend digits, and an additional output winding serially threading a number of the cores at positions in which the divisor value is greater than that of the dividend, to provide a decimal point indication.

8. Apparatus for selecting a quotient digit from individual divisor and dividend digits in a division system, including in combination a plane of elements, each of which is operable upon coincident energization of two intersecting addressing circuits, at least two groups of addressing circuits coupled to the plane of elements, each addressing circuit in a group representing a different value and being coupled to a different grouping of the elements, one group of addressing circuits representing divisor values and the other group of addressing circuits representing dividend values, a group of quotient digit sensing circuits coupled serially to the elements to provide outputs representative of an assigned value for an element which is operated in the plane, and a decimal point sensing circuit serially coupled to a number of the elements in the plane to indicate the relationship in which the divisor is of greater magnitude than the dividend.

9. Apparatus for division, for providing individual quotient digits for multidigit divisors and dividends from individual divisor and dividend digits, including in combination a group of bistable elements, input circuits responsive to the divisor and dividend values for selecting individual bistable elements for operation dependent upon the most significant individual divisor and dividend digits, and output circuits coupled to the bistable elements in selected patterns for providing numerically valued outputs which represent the probable quotient for divisor and dividend values having the selected most significant individual digits.

10. A system for dividing a multidigit dividend by a multidigit divisor using planes of individual elements and including in combination a divisor register for providing divisor digit signals on one out of a number of lines, a dividend register for providing dividend digit signals on one out of a number of lines, a quotient selection plane coupled to the divisor and dividend registers and providing trial quotient outputs, a quotient register responsive to the trial quotient outputs, the quotient register being operable under control signals to adjust the count of the quotient higher or lower by one, a multiplier register responsive to the quotient signals, a digit multiplier plane coupled to the outputs of the divisor register and the multiplier register and providing product outputs, a partial product register coupled to the output of the digit multiplier plane, a circuit for selectively providing complemented values coupled to the outputs of the partial product register and the divisor register, an adder plane coupled to the circuit for selectively providing complemented values and to the dividend register for adding values provided thereby, the outputs from the adder plane being applied to the dividend register to alter the count registered therein, a comparator plane coupled to the dividend register and the divisor register and providing outputs indicative of the relative rank of the digits provided thereto, and control circuits coupled to the quotient register, the quotient selection plane, the comparator plane, the divisor register, the dividend register, and the circuit for selectively providing complemented values for successively utilizing individual digits provided from the dividend register and the divisor register to perform a division which uses the quotient selection plane to provide an initial quotient value and the remaining circuits to adjust the initial quotient value.

11. The invention as set forth in claim 11, above, where the dividend and divisor digits are provided as decimal digits, where the quotient selection plane, the multiplier plane, the comparator plane and the adder plane consist of rectangularly disposed matrices of magnetic cores, where the control circuits are a group of gating circuits arranged to provide the desired control signals, and wherein in addition the system includes circuits for detecting the occurrence of zeros and not zeros in the outputs of each of the dividend registers and the divisor register.

12. A division system comprising a divisor register, a dividend register for storing an adjustable dividend value, a quotient selection circuit coupled to the divisor register and to the dividend register for providing a trial quotient responsive thereto, a quotient register responsive to the trial quotient and arranged to provide adjustment of the trial quotient by integral numbers of counts in response to control signals, a multiplier circuit responsive to the quotient signals and coupled to the divisor register for providing a trial product value, an adder circuit having inputs for two values and responsive on one input to signals from the dividend register, a circuit including a selective complementing circuit for providing signals alternatively from the divisor register and the multiplier circuit to the remaining input of the adder circuits, outputs from the adder circuit being applied to the dividend register to adjust the dividend value therein, thus to provide trial remainder values, a comparator circuit responsive to the signals from the dividend register and the divisor register for providing indications of the magnitude relation of the trial remainder and the divisor, and control circuits responsive to the outputs of the comparator circuits, the quotient circuit and the adder circuit for controlling the operation of the quotient register and the complementing circuit, to provide adjustment of the quotient provided by the quotient selection circuits and successively to provide digits from the divisor and dividend registers, the system providing a directly usable trial remainder when the trial remainder is positive and indicated by the comparator circuit to be less than the divisor.

13. A system for the division of a multidigit dividend by a multidigit divisor, the system including in combination a dividend register for the storage of a multidigit dividend quantity, the dividend register being arranged to be adjustable so as to incorporate a trial remainder in the dividend quantity, zero and not zero detection circuits coupled to the output of the dividend register, zero and not zero detection circuits coupled to the output of the divisor register, a matrix of magnetic cores coupled to the outputs of the dividend register and the divisor register and operating on digits provided concurrently therefrom to provide binary coded output signals, including a decimal point signal, the binary coded output signals constituting a trial quotient representative of the most probable quotient for multidigit numbers beginning with the divisor and dividend digits being provided, a quotient register responsive to the trial quotient values and arranged to be adjustable in count by integral steps, a multiplier circuit coupled to the divisor register and responsive to the trial quotient values for multiplying the trial quotient value by the divisor in successive steps, a comparator circuit including a plane of coincidently addressed bistable elements, the plane being addressed in one direction by the outputs of the dividend register and in the other direction by the outputs of the divisor register to provide indications of the relative magnitudes of the trial remainder and the divisor, adder circuits for selectively adding divisor quantities and complemented divisor quantities to the trial remainder stored in the dividend register, and control circuits responsive to the output of the adder circuits and the comparator circuit for controlling successive operations of the adder circuit.

References Cited in the file of this patent

UNITED STATES PATENTS

| | | |
|---|---|---|
| 2,467,419 | Avery | Apr. 19, 1949 |
| 2,615,624 | Brand et al. | Oct. 28, 1952 |
| 2,942,780 | Dickinson | June 28, 1960 |

OTHER REFERENCES

Maclean et al.: A Decimal Adder Using a Stored Addition Table, Proceedings of the Institute of Electrical Engineers, vol. 105, No. 20 (3/58), pp. 129–131.

Bloch et al.: Biased Controlled Arithmetic and Translating Matrix, I.B.M. Technical Disclosure Bulletin, vol. 1, No. 2, 8/58, pages 34, 5.

UNITED STATES PATENT OFFICE

CERTIFICATE OF CORRECTION

Patent No. 3,028,086 April 3, 1962

Huberto M. Sierra

It is hereby certified that error appears in the above numbered patent requiring correction and that the said Letters Patent should read as corrected below.

Column 7, line 52, for "law" read -- low --; column 11, lines 17 and 18, for "intequality" read -- inequality --; column 12, line 41, after "decimal" insert -- point --; line 45, for "trrial" read -- trial --; same column 12, line 49, for "nine" read -- nines --; column 14, line 29, for "order" read -- other --; column 19, line 46, for "digt" read -- digit --; column 22, line 15, for the claim reference numeral "11" read -- 10 --.

Signed and sealed this 24th day of July 1962.

(SEAL)
Attest:

ERNEST W. SWIDER
Attesting Officer

DAVID L. LADD
Commissioner of Patents